United States Patent
Eisenmenger et al.

(10) Patent No.: US 12,466,003 B2
(45) Date of Patent: Nov. 11, 2025

(54) VARIABLE GAGE BLANK

(71) Applicant: TWB COMPANY, LLC, Monroe, MI (US)

(72) Inventors: Mark Eisenmenger, Monroe, MI (US); Wayne Huisman, Monroe, MI (US); Isaac Luther, Monroe, MI (US)

(73) Assignee: TWB COMPANY, LLC, Monroe, MI (US)

( * ) Notice: Subject to any disclaimer, the term of this patent is extended or adjusted under 35 U.S.C. 154(b) by 195 days.

(21) Appl. No.: 17/873,388

(22) Filed: Jul. 26, 2022

(65) Prior Publication Data

US 2023/0127782 A1     Apr. 27, 2023

Related U.S. Application Data

(63) Continuation-in-part of application No. 16/543,744, filed on Aug. 19, 2019, now abandoned.

(51) Int. Cl.
| | |
|---|---|
| *B23K 33/00* | (2006.01) |
| *B23K 20/12* | (2006.01) |
| *B23K 20/24* | (2006.01) |
| *B23K 31/02* | (2006.01) |
| *B23K 101/18* | (2006.01) |

(52) U.S. Cl.
CPC .......... *B23K 33/004* (2013.01); *B23K 20/122* (2013.01); *B23K 20/129* (2013.01); *B23K 20/24* (2013.01); *B23K 31/022* (2013.01); *B23K 2101/185* (2018.08)

(58) Field of Classification Search
None
See application file for complete search history.

(56) References Cited

U.S. PATENT DOCUMENTS

| | | | |
|---|---|---|---|
| 2,748,429 A | 6/1956 | Agusa | |
| 6,802,444 B1 | 10/2004 | Petter | |
| 2010/0236316 A1 | 9/2010 | Flehmig | |
| 2019/0283188 A1* | 9/2019 | Bevc | ........... B23K 33/00 |

FOREIGN PATENT DOCUMENTS

| | | |
|---|---|---|
| DE | 102004035887 | 3/2006 |
| JP | H0732143 | 2/1995 |
| JP | 2000167676 | 6/2000 |
| WO | 2018027074 | 2/2018 |
| WO | 2018171961 | 9/2018 |

OTHER PUBLICATIONS

Notification of Transmittal of the Intl. Search Report and The Written Opinion of the Intl. Searching Authority; Nov. 20, 2020; PCT/US2020/046991; 14 pages.

\* cited by examiner

*Primary Examiner* — Daniel J. Schleis
(74) *Attorney, Agent, or Firm* — TUCKER ELLIS LLP

(57) ABSTRACT

A variable gage blank is formed from a set of components joined by a joining process. The set of components include a web, a first flange, and a second flange. The components have respective thicknesses. The first flange and the second flange may be modified to include a transition region with a variable thickness that terminates on an edge having a thickness substantially similar to a thickness of the web.

12 Claims, 7 Drawing Sheets

12,466,003 B2

VARIABLE GAGE BLANK

CROSS-REFERENCE TO RELATED APPLICATION(S)

This application is a continuation-in-part of U.S. Nonprovisional application Ser. No. 16/543,744, filed Aug. 19, 2019 and entitled "PRE-WELD MODIFICATION TECHNIQUE FOR A CUSTOM WELDED BLANK." The entirety of the aforementioned application is incorporated herein by reference.

TECHNICAL FIELD

In general, the present invention relates to tailored metal blanks and, in particular, a technique for joining blanks of different thicknesses to produce the tailored metal blanks

BACKGROUND

Metal blanks, and in particular sheet metal blanks, may be manufactured for a particular application. For example, tailored metal blanks are often created for various applications in the automotive industry. Such tailored metal blanks may be created by joining two or more metal blanks together via a welding process or other joining process. Some applications call for tailored blanks formed from pieces having a thickness difference. Further, such pieces, when joined, result in a tailored blank having a steep, abrupt discontinuity between the pieces at the joint. The discontinuity between the joined pieces creates additional issues for subsequent forming processes.

SUMMARY

A simplified summary is provided herein to help enable a basic or general understanding of various aspects of exemplary, non-limiting embodiments that follow in the more detailed descriptions and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a variable gage blank and a technique for forming such a blank are provided. The variable gage blank may be formed by a set of components joined by a joining process. The set of components include a web, a first flange, and a second flange. The components have respective thicknesses. The first flange and the second flange may be modified to include a transition region with a variable thickness that terminates on an edge having a thickness substantially similar to a thickness of the web.

These and other features of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Figure 1:
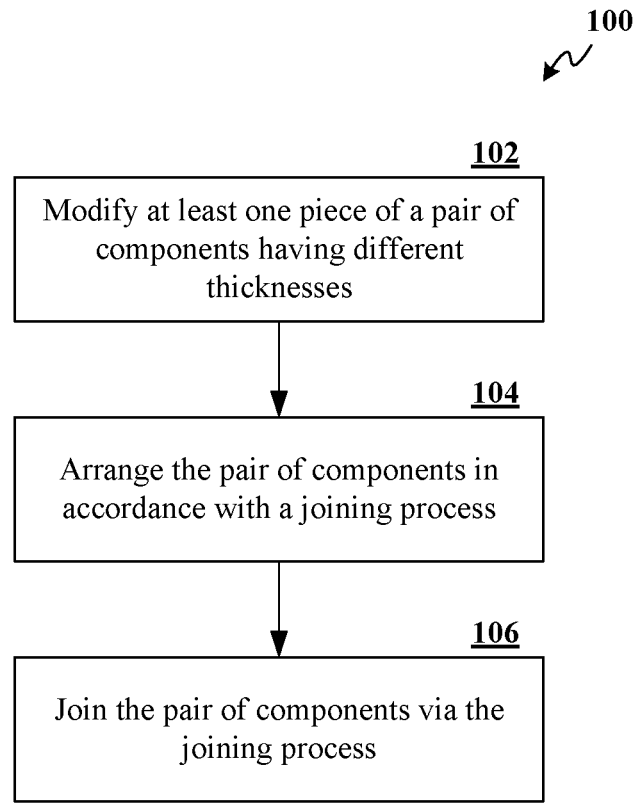
FIG. 1 illustrates a flow diagram of an exemplary, non-limiting embodiment for producing a tailored blank composed of a pair of components having varying thicknesses according to one or more aspects.

As described above, a tailored blank formed from pieces (e.g. metal blanks) having different thicknesses has many applications, specifically within the automotive industry. However, the thickness differences create a discontinuity at a joint leading to difficulties with bonding, welding, or joining via a joining process as well as a step after bonding that interferes with subsequent processing. In accordance with various techniques described herein, one or more of the pieces forming the tailored blank are modified to provide a joint between the pieces that mitigates the issues described above.

In one embodiment, a chamfer is formed on a thicker piece via machining or deformation. The chamfer provides a smoother transition from thick to thin so that a substantially similar thickness is provided by both pieces at the joint. The pieces can be bonded at the joint via laser welding, friction stir welding, or another joining process (e.g. arc welding, etc.).

More generally, at least one component of a pair of components (e.g. component metal blanks) is modified near a to-be-joined edge to create a transition region. The transition region provides a desired thickness at the edge with a transitioning thickness extending away from the edge and ending at a normal, unmodified thickness of the component. The modified component may be a thicker piece of the pair of components. Further, the desired thickness at the edge may be substantially similar to a thickness of a thinner piece of the pair. The transition region may be a linear transition (e.g. a linearly increasing thickness) from the edge. However, the transition region may also be non-linear and/or composed of segments providing constant thicknesses, linear changes, and/or non-linear transitions. Still further, both components of the pair may be modified to create respective transition regions terminating at a substantially similar thickness at the edge.

After modification, the components can be arranged in a butt joint for bonding. In one example, a welding process such as laser welding or friction stir welding may be employed to weld the butt joint. However, other joining processes may be employed in connection with the described modification technique to produce tailored blanks.

The transition region may be created through machining (e.g. cutting, grinding, etc.) to remove material from the modified component. Alternatively, the transition region may be created through a deformation process (e.g. pressing, coining, rolling, etc.) in which material is not removed. In addition, it is to be appreciated that combination of machining and deformation may be employed to form the transition region.

In one embodiment, a method for joining pieces of varying thicknesses is provided. The method includes modifying a first component of a pair of components, wherein components of the pair of components have dissimilar thicknesses. The method also includes arranging the pair of components relative to one another to define a weld joint in accordance with specifications for a friction stir weld process. The pair of components have substantially similar thicknesses along the weld joint subsequent to the modifying of the first component. In addition, the method includes welding the pair of components together along the weld joint via the friction stir weld process. The pair of components may include a pair of metallic blanks.

According to various examples, modifying the first component further may include machining the first component adjacent to an edge of the first component that forms a part of the weld joint. Machining the first component includes removing material from a face of the first component that is orthogonal to the edge to define a transition region from a first thickness of the first component to a second thickness at the edge. In this example, the method may also include removing material from a second face of the first component opposed to the first face to define a second transition region.

According to another example, modifying the first component further may include deforming the first component adjacent to an edge that forms a part of the weld joint to create a transition region from a first thickness of the first component to a second thickness at the edge. The method may also include modifying a second component of the pair of components. In one example, modifying includes removing material from the second component to define a third transition region. In another example, modifying includes deforming the second component to define a third transition region.

According to another embodiment, a method for joining pieces of varying thicknesses is provided. The method may include machining a first component of a pair of components having dissimilar thicknesses. The method may also include arranging the pair of components relative to one another to define a butt joint in accordance with a specification for a selected joining process. The pair of components have substantially similar thicknesses along the butt joint subsequent to the modifying of the first component. In addition, the method includes combining the pair of components together along the butt joint via the selected joining process.

In an example, machining the first component further includes removing material from a face of the first component, the face being orthogonal to an edge of the first component that forms a part of the butt joint. Removing the material defines a transition region where a first thickness of the first component reduces to a second thickness at the edge. In addition, the method may include removing material from a second face of the first component opposed to the first face to define a second transition region. The second thickness is substantially similar to a thickness of a second component of the pair of components along the butt joint.

In a further example, the method may include modifying a second component of the pair of components. Modifying includes removing material from the second component to define a third transition region. In another example, modifying includes deforming the second component to define a third transition region.

In yet another embodiment, a tailored joined blank is provided. The blank may include a first piece having a first thickness and a second piece having a second thickness. The first piece and the second piece are arranged to form a joint where the first piece and the second piece are bonded via a joining process. The first piece is machined to remove material from a face of the first piece adjacent to an edge that forms a part of the joint to create a transition region over which a thickness of the first piece reduces from the first thickness at a starting point of the transition region to a third thickness at the edge.

According to some examples, the third thickness is substantially similar to the second thickness and the joining process is at least one of a laser welding process or a friction stir welding process.

In yet another embodiment, a variable gage blank is provided. The variable gage blank includes a first piece having a first thickness, and first and second interfaces separated by a width of the first piece; a second piece having a second thickness; and a third piece having a third thickness. The second piece is bonded to the first piece at the first interface and the third piece is bonded to the first piece at the second interface via a joining process.

According to various examples, the second piece includes a transition region over which a thickness of the second piece changes from the second thickness at one end of the transition region to a thickness substantially similar to the first thickness at an edge of the second piece. The second piece is machined to remove material from a face of the second piece adjacent to the edge prior to bonding via the joining process. The second piece may be joined to the first interface of the first piece at the edge of the second piece.

The third piece includes a transition region over which a thickness of the third piece changes from the third thickness at one end of the transition region to a thickness substantially similar to the first thickness at an edge of the third piece. The third piece may be machined to remove material from a face of the third piece adjacent to the edge prior to bonding via the joining process. The third piece may be joined to the second interface of the first piece at the edge of the third piece.

According to additional examples, the second thickness and the third thickness may be different. The joining process is at least one of a laser welding process or a friction stir welding process. The variable gage blank is formed into a C-channel.

In another embodiment, a welded blank is provided. The blank includes a web having a first thickness; a first flange joined to the web on a first side of the web; and a second flange joined to the web on a second side of the web. The first flange has a first transition region where a thickness of the first flange changes from a second thickness to the third thickness. The second flange includes a second transition region where a thickness of the second flange changes from a fourth thickness to a fifth thickness.

In an example, the web, the first flange, and the second flange are joined by at least one of a laser welding process or a friction stir welding process. The second thickness may be greater than the third thickness and the second thickness may be substantially similar to the first thickness. The fourth thickness may be greater than the fifth thickness and the fourth thickness may be substantially similar to the first thickness. The second thickness and the fourth thickness may be different.

According to further examples, prior to joining to the web, the first flange may be machined to remove material from a face of the first flange to create the first transition region. In addition, prior to joining to the web, the second flange may be machined to remove material from a face of the second flange to create the second transition region.

In yet another embodiment, a method for joining pieces of varying thicknesses is provided. The method includes modifying a first flange and a second flange to create respective transition regions thereon. Respective thicknesses of the first and second flanges reduce over the respective transition regions to a first thickness at respective edges of the first and second flanges. The method also includes arranging the first flange and the second flange at opposed edges of a web such that the respective edges of the first and second flanges having the first thickness form respective weld joints with respective edges of the web. The method further includes welding the first flange to the web and the second flange to the web along the respective weld joints.

According to an example, the web has a thickness corresponding to the first thickness, and the respective thicknesses of first and second flanges are different.

These and other advantages of the techniques provided herein will be apparent to one of ordinary skill in the art.

With reference to the drawings, like reference numerals designate identical or corresponding parts throughout the several views. The inclusion of like elements in different views does not mean a given embodiment necessarily includes such elements or that all embodiments of the invention include such elements. The examples and figures are illustrative only and not meant to limit the invention, which is measured by the scope and spirit of the claims. Moreover, it should be understood that the drawings may not depict features to scale. Specific design features of formed components, similar to those disclosed herein, such as, for example, specific dimensions, orientations, locations, and/or shapes are generally determined, in part, by a particular application and/or use environment. The drawings may enlarge or exaggerate certain features to facilitate visualization.

Turning initially to FIG. 1, a flow diagram depicting a general overview of a technique to produce a tailored blank is illustrated. The technique is embodied as a method 100 that starts at reference numeral 102 where at least one component of a pair of components having different thicknesses is modified. The pair of components, which may be alternatively referred to as pieces, are component parts of a tailored blank. The components may be sheet metal blanks composed of steel or aluminum, for example.

According to an aspect, the at least one component is modified to form a transition region. The transition region may be formed via machining or material removal. A deformation may also be employed to form the transition region. The transition region may be formed on a surface of the modified component. The surface on which the transition region is defined is not a surface of the join edge. Rather, the surface modified is an orthogonal surface to the edge. However, the transition region is formed on the surface at a location adjacent to or near the edge. The transition region, according to an example, is region where a thickness of the modified component changes from a normal thickness to a desired thickness at the joining edge. The desired thickness is substantially similar to a thickness of the other component of the pair along its joining edge.

At reference numeral 104, the pair of components, after modification, are arranged in accordance with a joining process. For instance, the components may arranged to form a butt joint along the respective joining edges of the components. At numeral 106, the pair of components are bonded via the joining process. In accordance with one embodiment a welding process is selected to join the pair of components at the joining edge (e.g. along the butt joint). The welding process may be an arc welding process, a laser welding process, or a friction stir welding process.

Figure 2:
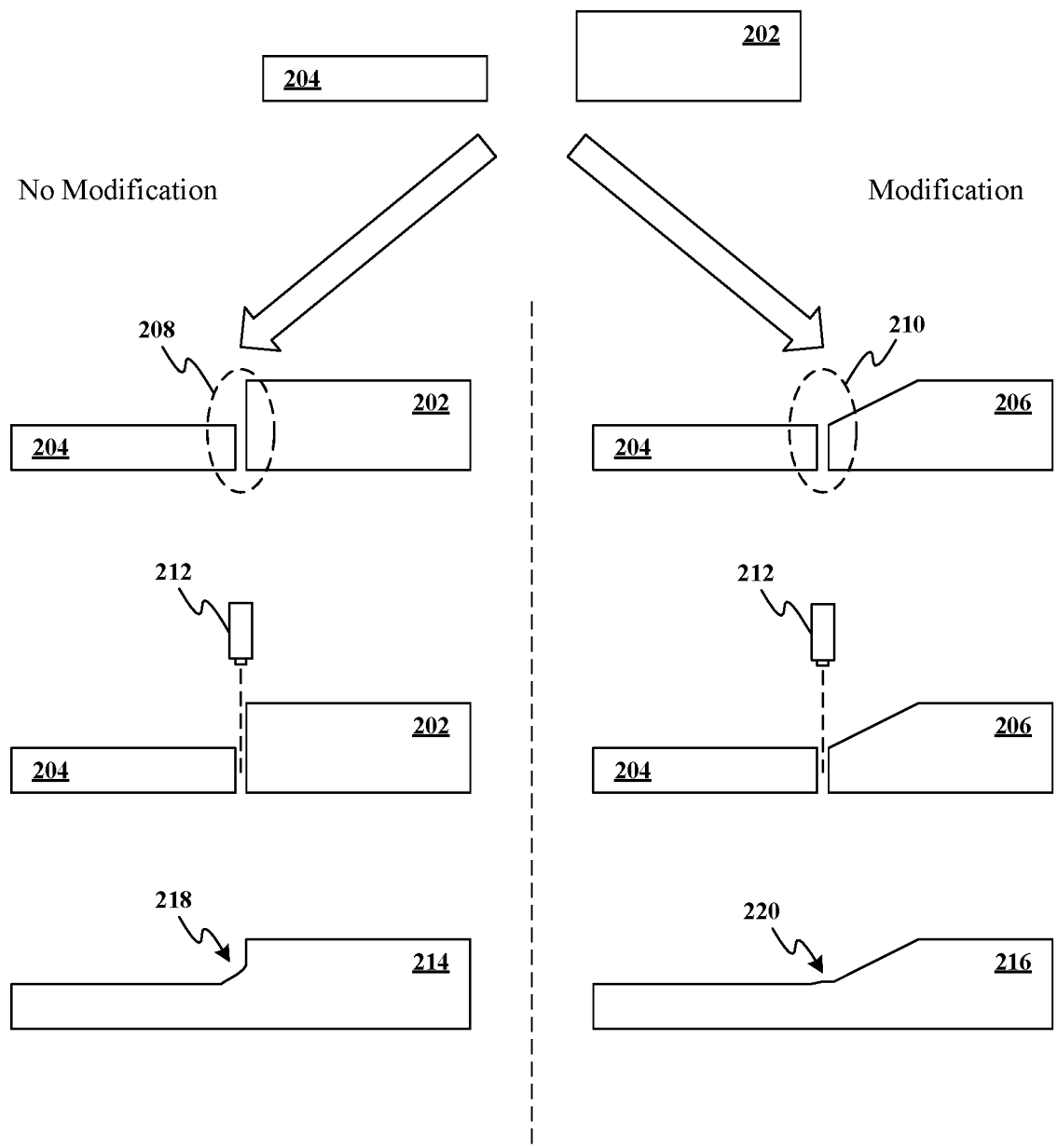
FIG. 2 illustrates a block diagram depicting an exemplary, non-limiting embodiment for forming tailored blanks in accordance with various aspects.

Turning to FIG. 2, a joining process of two components to form a tailored blank is graphically depicted. FIG. 2 illustrates the joining process both with and without modification as described above. As shown, a first component 202 and a second component 204 can be joined together along respective joining edges to form the tailored blank. Without modification in accordance with a technique described herein, a joining interface 208 between the two components is discontinuous in terms of thickness. The discontinuity may interfere with joining via a welding apparatus 212. For example, the discontinuity may not accommodate the tool of a friction stir welding process. Accordingly, the discontinuity causes a weld region 218 that includes a steep, abrupt change in height.

FIG. 2 shows the joining process after modification. As shown in FIG. 2, the modification forms a transition region, shown as a chamfer on first component, to result in a modified component 206. The transition region defines a transition from the relatively larger thickness of the first component 202 to a thickness at the joining edge that is substantially similar to a thickness of the second component 204. Accordingly, a joining interface 210 between the two components is substantially continuous in terms of thickness. When bonded via the welding tool 212, a smoother weld region 220 results.

Figure 3:
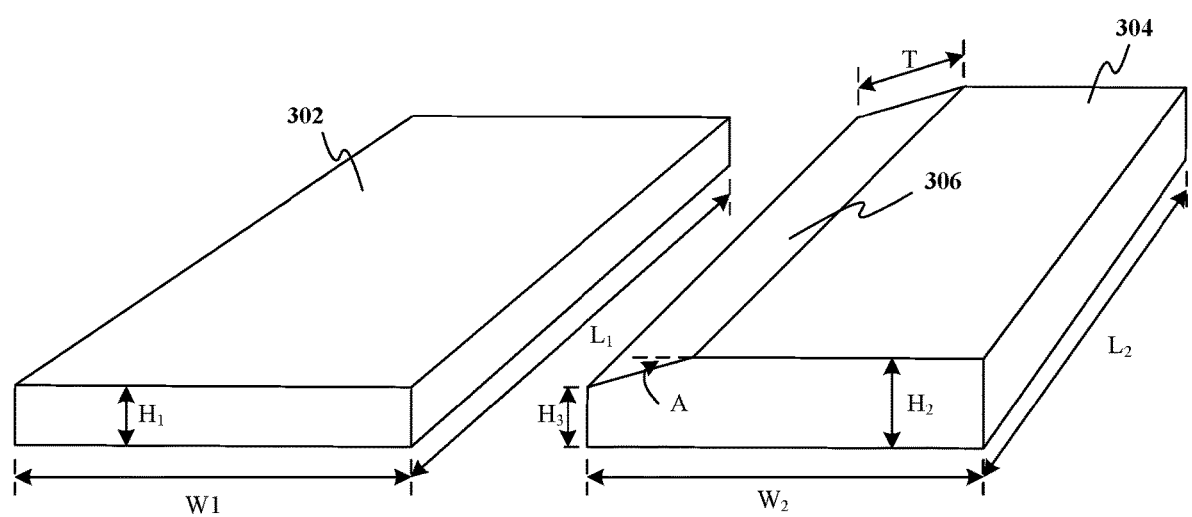
FIG. 3 is a perspective view of a pair of components prior to joining to form a tailored blank.

FIG. 3 illustrates a perspective view of a pair of components (e.g. metal blanks) prior to joining to form a tailored blank. As shown, a first component 302 has a first thickness $H_1$, a first width $W_1$, and a first length $L_1$. A second component 304 has a second thickness $H_2$, a second width $W_2$, and a second length $L_2$. In addition, the second component 304 is modified to include a transition region 306 having a transition length T extending at an inclined angle A relative to an unmodified surface. As shown, the transition region 306, over the length T, defines a region of changing thickness from the second thickness $H_2$ to a third thickness $H_3$ at an edge of the modified component 304. In one aspect, the third thickness $H_3$ is substantially equal to the first thickness $H_1$.

In one example, the first length L1 and the second length L2 may be equal such that a butt joint to be welded runs an entirety of that length. For instance, the length may be approximately 1 meter or 1040 millimeters. In a further example, the first thickness H1 and the third thickness H2 may be approximately 9.5 millimeters whereas the second thickness H2 may be approximately 15.8 millimeters. The first width W1 and the second width W2 may be similar or different. For example, the first width may be 300 millimeters and the second width may be 90 millimeters. According to an aspect, the transition distance T may be approximately 25 millimeters at an angle A of 75 degrees given the exemplary above. It is to be appreciated that the above dimensions are merely exemplary to illustrate one type of tailored blank that may be produced with the techniques described herein. A variety of other thicknesses, lengths, and widths for the components are contemplated. The techniques described herein contemplate two components of substantially any dimensions provided the thicknesses initially differ.

Figure 4:
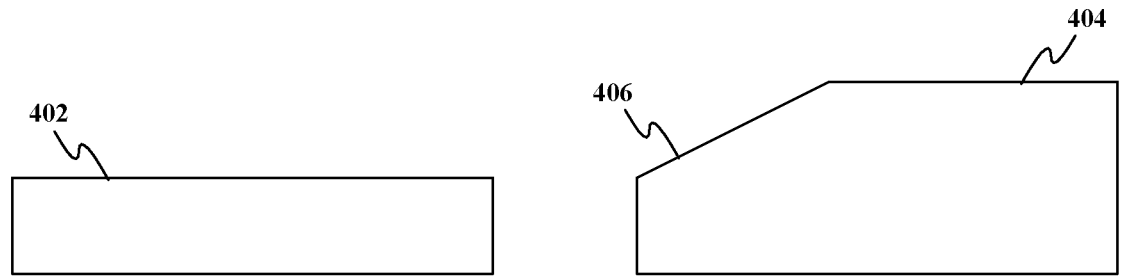
FIG. 4 illustrates an exemplary, non-limiting embodiment of a modification to form a transition region according to various aspects.
Figure 5:
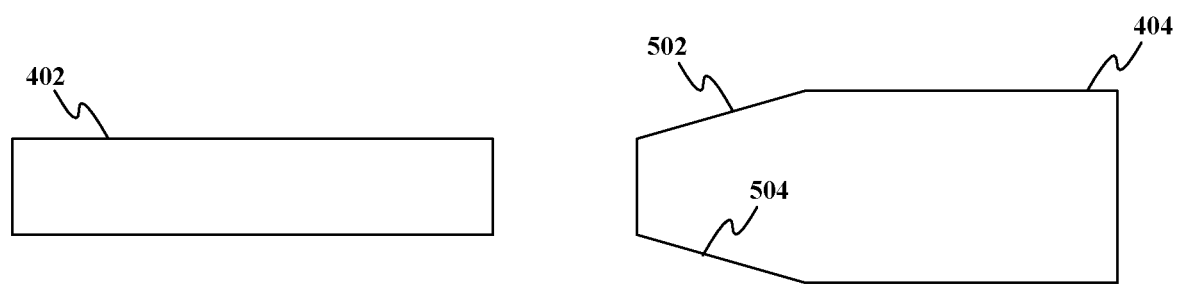
FIG. 5 illustrates an exemplary, non-limiting embodiment of a modification to form a transition region according to various aspects.
Figure 6:
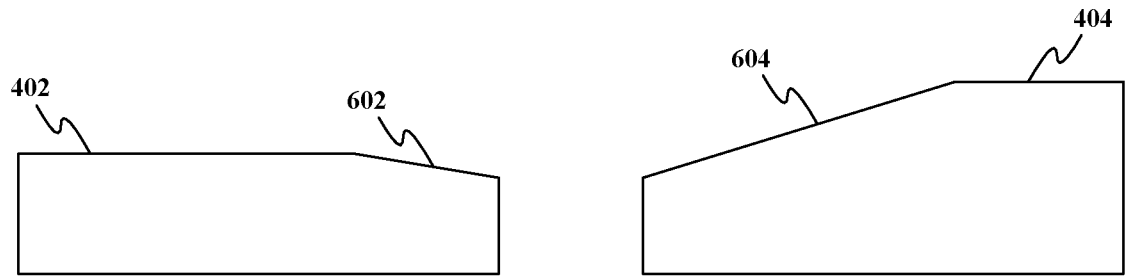
FIG. 6 illustrates an exemplary, non-limiting embodiment of a modification to form a transition region according to various aspects.

FIGS. 4-7 illustrate various modifications that may be employed in accordance with the techniques described herein depending on a desired application for a resultant tailored blank. FIG. 4 illustrates a first component 402 and a second component 404 that will be joined to form a tailored blank. In FIG. 4, the second component 404 is modified to create a transition region 406 or chamfer on an upper surface thereof. In another embodiment shown in FIG. 5, the second component 406 is modified to define two transition regions 502 and 504. One region 502 is a chamfer formed on the upper surface of the second component 404 and the other transition region 504 is formed on a lower surface of the second component 404. In the embodiment of FIG. 6, the first component 402 and the second component 404 are both modified so that the first component 402 includes a first transition region 602 and the second component 404 includes a second transition region 604. The first and second transition regions 602 and 604 are depicted on respective upper surfaces of the components 402 and 404. However, it is to be appreciated that the regions may be formed on lower surfaces or a mixed case where one is on an upper surface and one is on a lower surface. Further, it is to be appreciated that first component 402 and second component 406 may be modified to include two regions each similar to that shown in FIG. 5. FIGS. 4-6 illustrate linear transition regions with a continuous thickness transition. It is to be appreciated that the transition regions may be non-linear.

Figure 7:
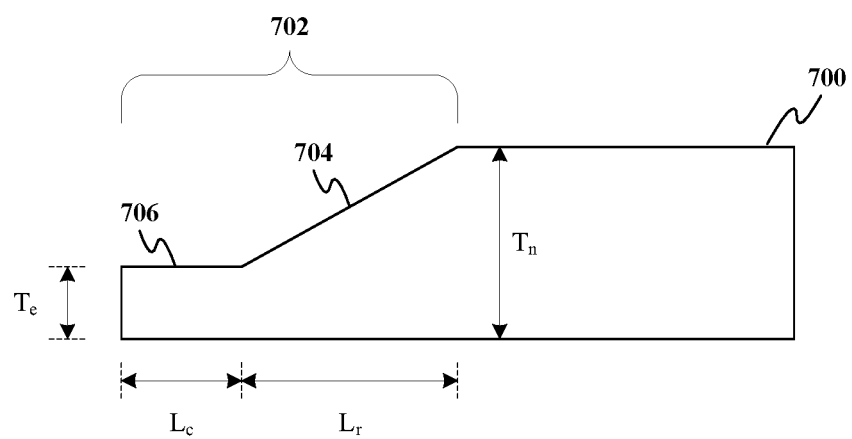
FIG. 7 illustrates an exemplary, non-limiting embodiment of a modification to form a transition region according to various aspects.

In FIG. 7, a transition region composed of different segments is depicted. A component blank 700 is shown having a normal thickness $T_n$ and a transition region 702 over which the thickness reduces from the normal thickness $T_n$ to an edge thickness $T_e$. The transition region 702 includes a first segment 704 that includes a ramp transition having a length $L_r$ over which the thickness reduces from the normal thickness to the edge thickness. The region 702 also includes a second segment 706 where the thickness is constant over a length $L_c$.

Figure 8:
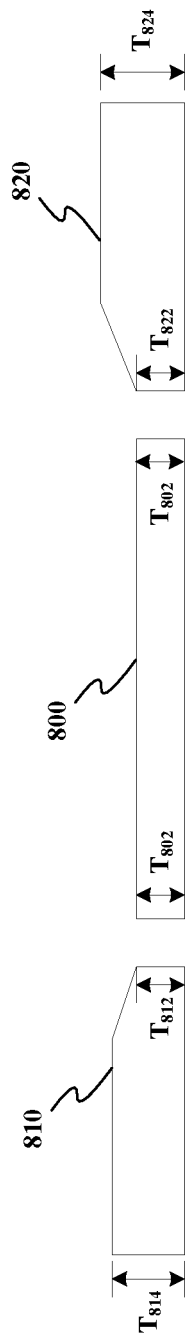
FIG. 8 illustrates an exemplary, non-limiting embodiment of a set of components joinable to form a variable gage blank.

Turning now to FIG. 8, an exemplary, non-limiting embodiment of a set of components joinable to form a variable gage blank are illustrated. The set of components include a first piece or web 800, a second piece or first flange 810, and a third piece or second flange 820. The web 800 has a thickness, $T_{802}$, and includes a first side (also referred to as an edge or an interface) and a second side (edge or interface).

The first flange 810 has a normal thickness, $T_{814}$, and a thickness, $T_{812}$, at an edge. In addition, as shown in FIG. 8, the first flange 810 includes a transition region where the thickness changes from thickness $T_{814}$ to thickness $T_{812}$. Similarly, the second flange 820 has a normal thickness, $T_{824}$, and a thickness, $T_{822}$, at an edge. The second flange 820 also includes a transition region where the thickness changes from thickness $T_{824}$ to thickness $T_{822}$. According to an embodiment, the transition regions for the first flange 810 and the second flange 820 may be formed utilizing the techniques described above.

According to various aspects, the thicknesses $T_{812}$ and $T_{822}$ at respective edges of first flange 810 and second flange 820 may be substantially similar to thickness $T_{802}$ of web 800. Accordingly, when the web 800, first flange 810, and second flange 820 are arranged as shown in FIG. 8, respective thickness at the interfaces between components are substantially similar. In another embodiment, the thicknesses $T_{824}$ and $T_{814}$ may be the same, or different. For example, thickness $T_{824}$ may be greater than $T_{814}$ or vice versa.

In an embodiment, the components can be arranged as shown in FIG. 8 to form a first joint between the web 800 and first flange 810 and a second joint between the web 800 and the second flange 820. The first and second joints are located on opposed sides or edges of web 800 separate by a width of web 800. The first and second joints can be joined via a joining process (e.g. a welding process such as arc welding, laser welding, friction stir welding, etc.).

Figure 9:
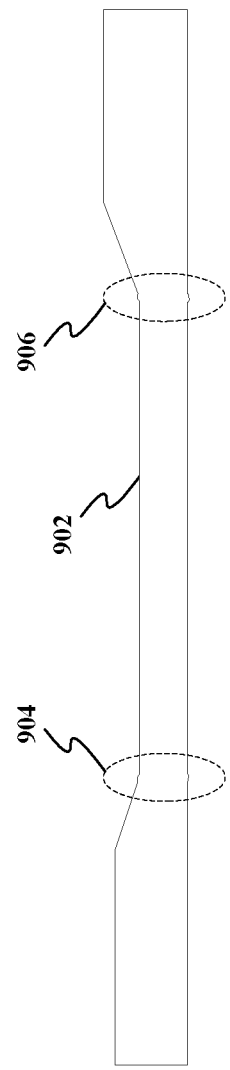
FIG. 9 illustrates an exemplary, non-limiting embodiment of a variable gage blank formed from the set of components of FIG. 8.

After joining, the set of components may form a variable gage welded blank such as blank 902 depicted in FIG. 9. The blank 902 includes a first weld joint 904 between the first flange 810 and web 800 and a second weld joint 906 between the second flange 820 and the web 800.

Figure 10:
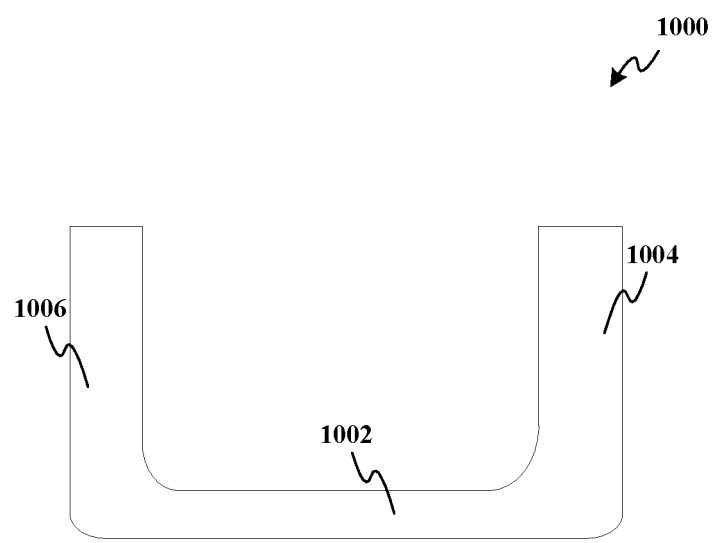
FIG. 10 illustrates an exemplary, non-limiting embodiment of a variable thickness rail formable from the variable gage blank.

Turning briefly to FIG. 10, the blank 902 in FIG. 9 can be formed into a C-channel 1000. The C-channel includes a center portion 1002 (corresponding to web 800 for example) and two arm portions 1004, 1006 extending substantially orthogonally from the center portion 1002. The arm portions 1004 and 1006 may correspond to the first flange 810 and second flange 820, respectively.

It is to be appreciated that various features or aspects of the embodiments described herein can be utilized in any combination with any of the other embodiments.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A welded part, comprising:
a first piece having a first thickness, and first and second interfaces separated by a width of the first piece;
a second piece having a second thickness; and
a third piece having a third thickness,
wherein the second piece is bonded to the first piece at the first interface and the third piece is bonded to the first piece at the second interface via a joining process,
wherein the second thickness and the third thickness are greater than the first thickness, wherein the second piece is machined, prior to bonding via the joining process, to remove material from a face of the second piece adjacent to an edge of the second piece to form a second-piece transition region over which the a thickness of the second piece linearly and continuously changes from the second thickness at one end of the second-piece transition region to a thickness substantially similar to the first thickness at the edge of the of the second piece, wherein the third piece is machined, prior to bonding via the joining process, to remove material from a face of the third piece adjacent to an edge of the third piece to form a third-piece transition region over which the a thickness of the third piece linearly and continuously changes from the third thickness at one end of the third-piece transition region to a thickness substantially similar to the first thickness at the edge of the of the third piece.

2. The welded part of claim 1, wherein the second piece is joined to the first interface of the first piece at the edge of the second piece.

3. The welded part of claim 1, wherein the third piece is joined to the second interface of the first piece at the edge of the third piece.

4. The welded part of claim 1, wherein the second thickness and the third thickness are different.

5. The welded part of claim 1, wherein the joining process is at least one of a laser welding process or a friction stir welding process.

6. A welded part, comprising:
a web having a first thickness;
a first flange joined to the web on a first side of the web; and
a second flange joined to the web on a second side of the web, the second side being separated from the first side by a width of the web,
wherein the first flange is machined, prior to joining to the web, to remove material from a face of the first flange to create a first transition region,
wherein over the first transition region a thickness of the first flange linearly and continuously changes from a second thickness to a third thickness at an edge of the first flange,
wherein the second flange is machined, prior to joining to the web, to remove material from a face of the second flange to create a second transition region,
wherein over the second transition region a thickness of the second flange linearly and continuously changes from a fourth thickness to a fifth thickness at an edge of the second flange,
wherein the second thickness and the fourth thickness are greater than the first thickness,
wherein the first flange is joined at the edge of the first flange having the third thickness to the first side at the web, and
wherein the second flange is joined at the edge of the second flange having the fifth thickness to the second side of the web.

7. The welded part of claim 6, wherein the web, the first flange, and the second flange are joined by at least one of a laser welding process or a friction stir welding process.

8. The welded part of claim 6, wherein the second thickness is greater than the third thickness and the second thickness is substantially similar to the first thickness.

9. The welded part of claim 6, wherein the fourth thickness is greater than the fifth thickness and the fifth thickness is substantially similar to the first thickness.

10. The welded part of claim 6, wherein the second thickness and the fourth thickness are different.

11. The welded part of claim 1, wherein the first piece, the second piece, and the third piece are formed into a C-channel after the joining process.

12. The welded part of claim 6, wherein the web, the first flange, and the second flange are formed into a C-channel after the joining process.

* * * * *